Feb. 11, 1941.    J. F. CAMPION    2,231,560
ROOFING TRUCK
Filed Aug. 22, 1939

INVENTOR:
James F. Campion,
BY: Christian R. Nielsen
ATTORNEY.

Patented Feb. 11, 1941

2,231,560

UNITED STATES PATENT OFFICE 2,231,560

ROOFING TRUCK

James F. Campion, Freeport, N. Y.

Application August 22, 1939, Serial No. 291,407

4 Claims. (Cl. 105—157)

The invention relates to apparatus for use in roof construction, and particularly to a roofing truck device, or movable scaffold, adapted to be used on various forms of roofs regardless of the pitch of the roof, and especially designed to facilitate movement of a platform about upon a roof, and to contribute to the safety of the workers in such operations.

It is an especial aim of the invention to provide a truck scaffold device which may be readily moved by a single operator upwardly or downwardly upon the sloping surface of a roof, with safety, and having novel features of construction contributing to the effectiveness and safety of the appliance.

An important aim of the invention is to present a truck of this type which may be adjusted quickly to adapt it to provide a level platform on a roof of any pitch. A further important object is to provide such a truck which is adapted to be moved upon fairly steep roofs with a minimum liability of accidents through slipping of the truck wheels upon the roof rails.

Another very important aim of the invention is to present a novel construction and relation of parts wherein, in the adjustment of the truck device from place to place upon a roof, at each stage where movement is stopped, the device will, notwithstanding that it is wheeled for movement, come automatically to rest with its body portion resting directly upon the roof independently of the wheels.

Another important aim of the invention is to provide a novel construction for the mounting and operation of the wheels yet movable to and from tractive and supporting relation to a roof surface.

A further important aim is to present a device of this character especially adapted to and operative in use upon steel frame roofs of greenhouses, and the like, although also adapted to use upon tin roofs, slate, shingle, and other roofs, whether having a high pitch or relatively flat, nearly horizontal decks.

Additional objects, advantages and features of invention reside in the construction, arrangement and combination of parts involved in the embodiment of the invention, as will be more readily understood from the following description and accompanying drawing, wherein.

Figure 1:
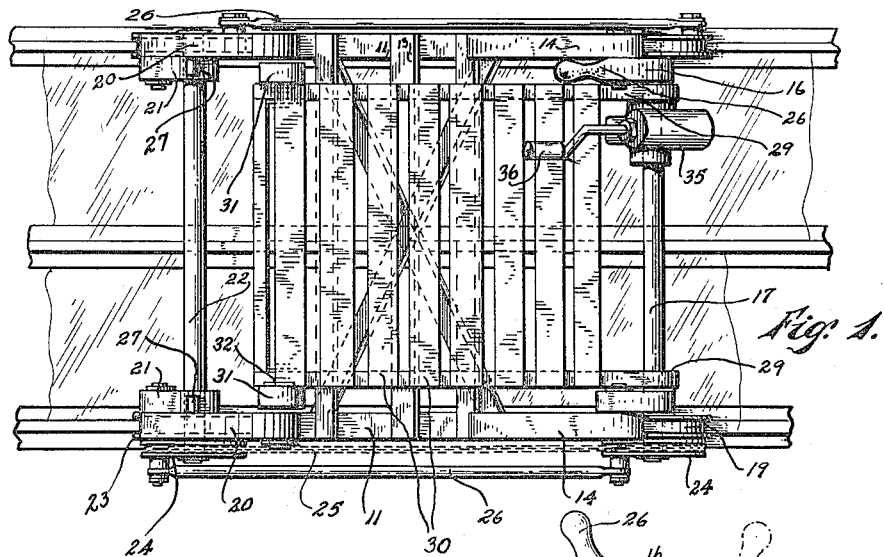
Figure 1 is a top view of a truck, constructed in accordance with my invention.
Figure 2:
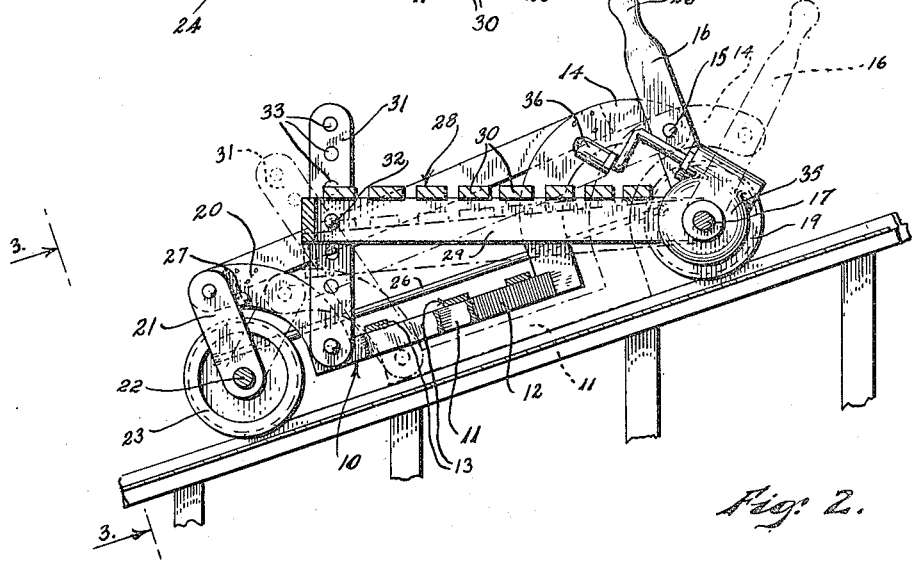
Figure 2 is a side elevation thereof in use upon a sloping roof, in lowered or braked position of the platform being indicated in dotted lines.
Figure 3:
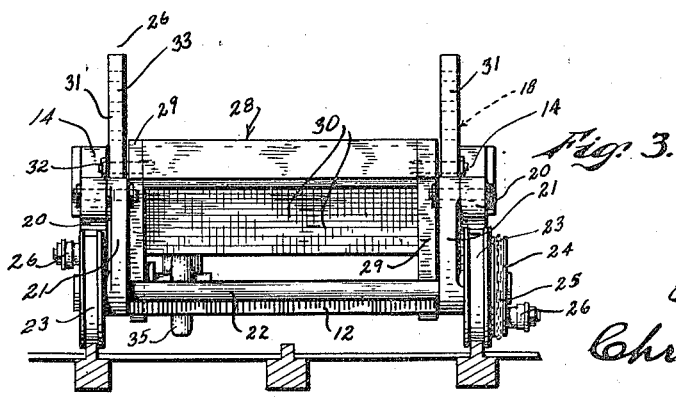
Figure 3 is a cross section of a portion of a roof showing my truck in place thereon.

There is illustrated a lower frame 10, consisting of two side members 11, which may be of channel form adapted to rest over roof bars or which may be suitably faced to rest upon various roof surfaces at their lower sides. These side members are parallel and connected by diagonal stays 12, and cross bars 13. The frame may be made of a width so that each of the side members will aline with roof bars or other roof elements, as desired. At the forward upper end of the frame 10, there are provided forwardly extending brackets 14, the forward parts of which are elevated suitably and provided with a transverse rock shaft 15 mounted thereon, on one end of which there is fixed a lever 16 extending downwardly, and serving as a support of a revoluble cross shaft 17, the opposite end of which is supported by an arm 18, also fixed on the rock shaft and supporting the shaft 17 revolubly. On each end of the shaft 17 there are fixed wheels 19, in line with the respective side members 11 of the frame 10. These wheels may be grooved to fit the rails of a greenhouse roof, or may be otherwise treaded, to give traction upon roofs of various surfaces.

At the rear end of the frame 10, upwardly and rearwardly extended brackets 20 are provided, corresponding to the ones 14, but extended less longitudinally of the device, and on these there are pivoted respective arms 21 supporting revolubly at their lower ends a transverse shaft 22 on the respective ends of which wheels 23 are fixed, corresponding to the wheels 19 before described, and located outwardly of the arms 21 The lever 16 and arm 18 are also located inwardly of the respective wheels 19 At one side of the machine sprockets 24 are fixed on respective wheels 19 and 23, and connected by an endless chain 25. These sprockets and chain may be located as found most convenient, either inside or outside the wheels. At both sides of the machine connecting rods 26 are connected between the two wheels, at the respective sides to serve as tension and truss members in the maintenance of the spacing of the wheels longitudinally and to transmit thrust from the front wheels to the rear wheels in their movement upon their pivotal mounting.

The lever 16 is extended upwardly a distance above the rock shaft 15 to serve as a handle 26 by which it may be operated, as required. It will thus be seen that the frame 10 will be supported upon the wheels 22 when the lever is swung rearwardly at its upper part so as to bring the arms 18 and 21 to a position approximately vertical to the plane of the frame 10, at which time the peripheries of the wheels at their lower sides will be below the plane of said frame and adapted to support the frame upon a roof structure. When the lever 16 is swung forwardly at its upper part the forward wheels 19 will swing under the bracket 14 and upwardly, while the wheels 23 will swing rearwardly and outwardly from the brackets 20 and upwardly, allowing the frame 10 to be lowered upon the roof. In order for the wheels to be retained in supporting relation for ready movement to inoperative position, there are shown on the rear brackets 20 stops 27, against which the arms 21 will strike in their forward movement after passing slightly forwardly of vertical position with respect to the plane of the frame 10, and will be free to move rearwardly at all times by pressure upon the lever handle 26.

A working platform 28 is shown, of suitable shape and extent for supporting workmen and materials in such number as required, in the present instance consisting of a number of longitudinal members 29 on which cross planks 30 are laid, the members 29 being pivotally supported upon the shaft 17. At the rear, this frame is supported upon two pivoted standards or arms 31 pivoted upon the frame 10, and adjustably connected to the rear part of the platform 28 by means of pins 32 inserted through any of series of openings 33, formed in the standards 31, and arranged longitudinally thereof.

At the forward end of the platform 28 means is provided for effecting traction of the truck wheels upon a roof, for which purpose a worm gear 34 is fixed upon the shaft 17, and a worm drive unit 35 is mounted upon the forward end of the platform 28, including the hand crank 36 by which it may be operated to drive the shaft 17 and so move the wheels 19. Through the chain 25 the rear wheels 23 are also likewise driven.

In the use of this device, when it is hoisted and placed upon a roof with the wheels 19 at the forward end and the wheels 23 toward the lower part of the roof slope, and the lever 16 inclined forwardly at its upper part, the frame 10 will rest upon the roof until such time as it is desired to move it upwardly or downwardly upon the roof. Desiring such movement, the operator standing upon the platform 28 may grasp the handle 26 of the lever 16, drawing it rearwardly, so as to thrust the wheels forwardly and effect lifting of the frame 10 from the roof. At such times, the worm device 35 will serve as a brake to prevent coasting of the truck. The lever being moved rearwardly until the supporting arms between the brackets and shafts 17 and 22 have passed dead center, the rear arms 21 will engage the stop 27 and check further movement. The load upon the truck tending to make the truck move rearwardly, will also aid in holding the wheels at their forward supporting position. The operator may now operate the crank 36 to rotate the shaft 17 and wheels 19, and through the chain 25 and shaft 22 drive the rear wheels 23 likewise. When the truck has been moved to the desired position, forward pressure on the handle 26 will move the wheels rearwardly into inoperative position, allowing the frame 10 to drop upon the roof, whereby it will act as a brake in addition to the braking action of the worm upon the shaft 17 up to that time.

It is to be noted that the operating crank by which the wheels are operated for traction is located close to the lever 16, so that the latter may be operated quickly at any time after movement of the truck to a desired position, or in case the traction of the wheels on the sloping roof becomes faulty.

Any other form of link or framing connection other than the eccentrically connected links 26 may be utilized if desired. The latter however, have the advantage of contributing to the drive of the wheels, as well as effecting proper spacing of the two sets of wheels in coordination with the chain 25.

While I have disclosed a specific embodiment of the invention, it will be understood that this is purely exemplary, and that various modifications in the construction, arrangement and design of the parts may be made without departing from the spirit of the invention, as more particularly set forth in the appended claims.

I claim:

1. A roofing truck of the character described, comprising a frame, forward and rear pairs of wheels having a pivotal support mounting on the frame for movement of the frame to and from contacting engagement with a roof, means at one end of the frame to move the pivotal support to and from operative position, a chain drive connection between forward and rear wheels and a spacing and operating means connected between forward and rear wheels consisting of a connecting rod connected eccentrically to forward and rear wheels on radii of the same length and being of a length equal to the distance between the axes of the wheels and means to drive the wheels at one end of the device.

2. A roofing truck of the character described comprising a frame, forward and rear pairs of wheels, each pair of wheels being fixed on a respective revoluble shaft, a pivoted support for each shaft including means to swing one shaft on said support for movement of the wheels from supporting relation of the frame to a non-supporting position whereby the frame will contact the roof, a chain drive connection between front and rear wheels and link connections between front and rear wheels whereby they are spaced apart, a work platform mounted on one of said shafts, an adjustable support between the platform and the frame adjacent the other of said shafts, and operative means for said one shaft on said platform.

3. The structure of claim 2 in which said frame includes roof-engaging friction elements in operative relation to a roof, when said wheels are moved from supporting relation to the frame.

4. The structure of claim 2 in which said support for each shaft comprises arms pivoted on the frame a distance above the normal supporting positions of the shafts, one of the arms consisting of a lever having an operating handle extended from its pivot for the purposes described, said operative means for said one shaft including a manually operated member adjacent said operating handle.

JAMES F. CAMPION.